US006560624B1

(12) United States Patent
Otani et al.

(10) Patent No.: US 6,560,624 B1
(45) Date of Patent: May 6, 2003

(54) METHOD OF EXECUTING EACH OF DIVISION AND REMAINDER INSTRUCTIONS AND DATA PROCESSING DEVICE USING THE METHOD

(75) Inventors: Sugako Otani, Tokyo (JP); Hiroyuki Kondo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/477,001

(22) Filed: Jan. 3, 2000

(30) Foreign Application Priority Data

Jul. 16, 1999 (JP) .......................................... 11-203650

(51) Int. Cl.[7] ................................................ G06F 7/52
(52) U.S. Cl. ....................................... 708/655; 712/221
(58) Field of Search ................................ 708/655, 656; 712/221

(56) References Cited

U.S. PATENT DOCUMENTS

| 3,733,477 | A | | 5/1973 | Tate et al. | |
| 5,517,439 | A | * | 5/1996 | Suzuki et al. | ............... 708/655 |
| 5,574,677 | A | | 11/1996 | Cohen | |
| 5,784,307 | A | | 7/1998 | Sheaffer | |
| 5,805,489 | A | * | 9/1998 | Fernando | .................... 708/655 |
| 6,047,305 | A | * | 4/2000 | Yano | ......................... 708/655 |
| 6,061,781 | A | * | 5/2000 | Jain et al. | ................... 708/552 |

FOREIGN PATENT DOCUMENTS

| TW | 329485 | 4/1998 |
| TW | 347513 | 12/1998 |

OTHER PUBLICATIONS

"M32R–Family Mitsubishi Single–Chip Microcomputer Software Manual", Mitsubishi Electric Corporation, published May 1998 (w/ English abstract) pp. 2–10, 2–11, 3.30, 3–31, 3–68 & 3–69.

John L. Hennessy and David A. Patterson, "Computer Organization and Design", Section 4.7, Nikkei BP, Japan, published Apr. 19, 1996 (w/ English abstract) pp. 626–631–666–671.

David A. Patterson and John L. Hennessy, "Computer Architecture", Appendix A.2 and A.9, Nikkei BP, Japan, published Dec. 25, 1992 (w/ English abstract) pp. 190–199.

* cited by examiner

Primary Examiner—David H. Malzahn
(74) Attorney, Agent, or Firm—Burns, Doane, Swecker & Mathis, LLP

(57) ABSTRACT

A data processing device comprises an instruction decoding unit for decoding a code of either a division instruction or a remainder instruction applied thereto, the instruction code having a size field for storing data size information. When a control unit receives a decoded result from the instruction decoding unit, the decoded result indicating the data size information stored in the size field of the instruction code, it presets a number of times that one loop iteration comprised of steps required for executing either the division instruction or the remainder instruction is to be carried out, based on the data size information. An ALU disposed within an arithmetic unit performs the loop iteration for either the division instruction or the remainder instruction only the number of times preset by the control unit.

15 Claims, 8 Drawing Sheets n-BIT DIVIDEND DATA

OP1 : FIRST OPERAND CODE
OP2 : SECOND OPERAND CODE
R1 : DESTINATION REGISTER IDENTIFIER
R2 : SOURCE REGISTER IDENTIFIER
S : SIZE FIELD

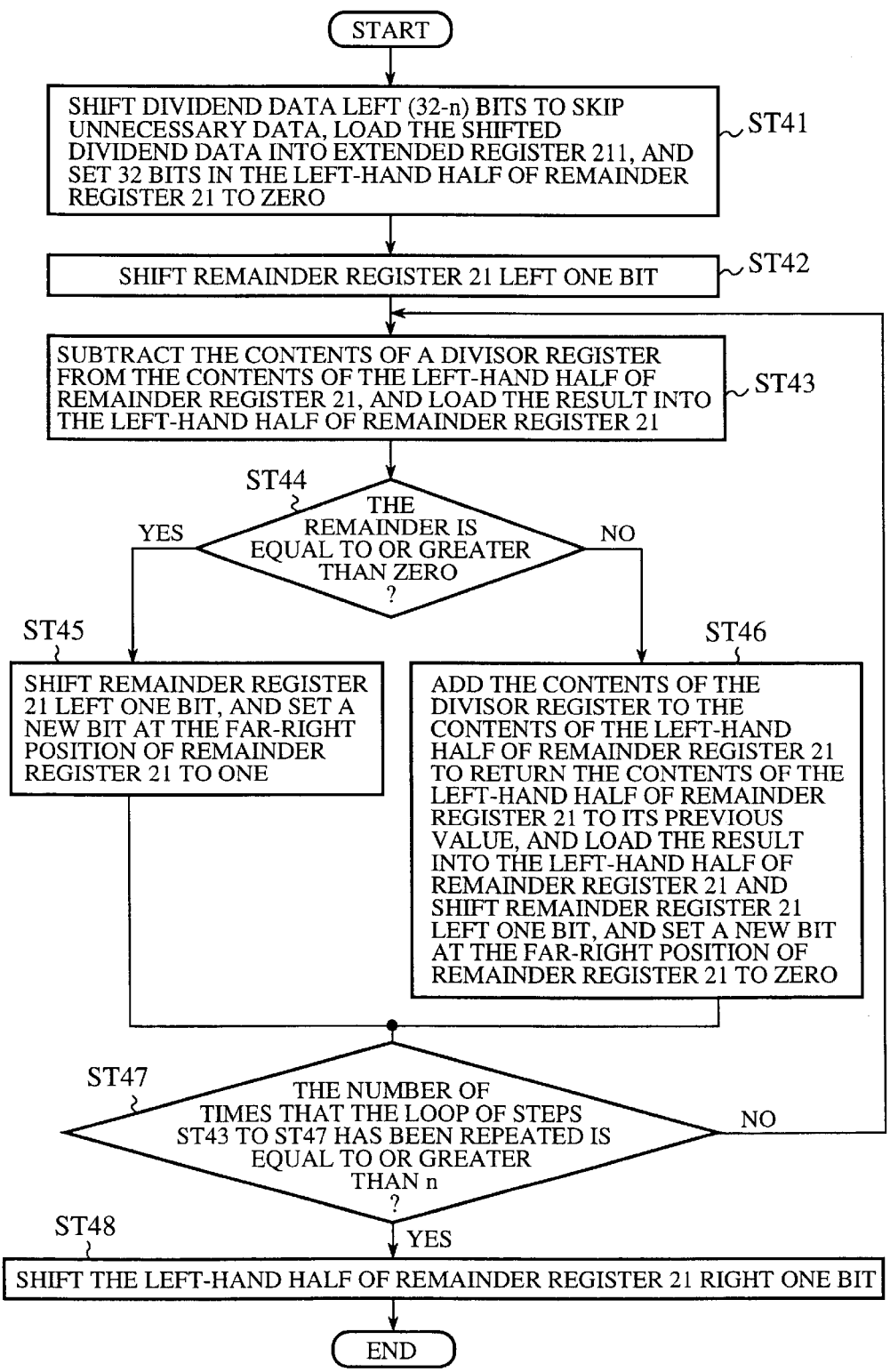

FIG.6
CONTROL SIGNALS FOR USE WITH DIVISION HARDWARE

| | STEP | SHIFTER CONTROL (SHIFT DIRECTION) CTS | CODE BIT DVSGN | SHIFT REMAINDER REGISTER 21 CT1 | SET THE LSB OF REMAINDER REGISTER 21 CT2 | ALU CONTROL CTA |
|---|---|---|---|---|---|---|
| NAME OF PROCESS CYCLE OR SIGNAL LINE | ST41 | LEFT | * | * | * | * |
| | ST41 | * | * | * | * | * |
| REPETITIVE STEPS | ST42 | * | * | LEFT ONE BIT | 0 | SUBTRACTION |
| | ST43 | * | * | NOP2 | * | NOP1 |
| | ST45 | * | 0 (REMAINDER≧0) | LEFT ONE BIT | 1 | ADDITION |
| | ST46 | * | 1 (REMAINDER<0) | LEFT ONE BIT | 0 | |
| | ST48 | * | * | RIGHT ONE BIT | * | * |

* : Don't Care, NOP1 : ADDITION OF +0
NOP2 : NO OPERATION

FIG.8
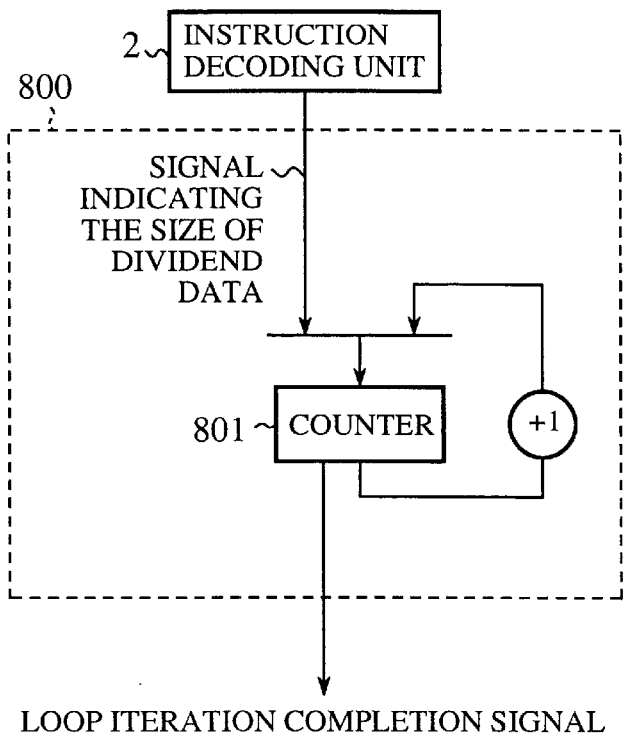
FIG.9
| DIVIDEND | DIVISOR | AMOUNT OF SHIFT | INITIAL VALUE OF COUNTER |
|---|---|---|---|
| n BITS | 32 BITS | (32-n) BITS | (32-n) |
FIG.10 (PRIOR ART)
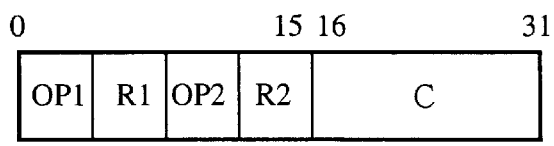
OP1 : FIRST OPERAND CODE
OP2 : SECOND OPERAND CODE
R1 : DESTINATION REGISTER IDENTIFIER
R2 : SOURCE REGISTER IDENTIFIER
C : CONSTANT NUMBER PORTION

METHOD OF EXECUTING EACH OF DIVISION AND REMAINDER INSTRUCTIONS AND DATA PROCESSING DEVICE USING THE METHOD

BACKGROUND OF THE INVENTION

1. Field of the Invention

The present invention relates to a method and a data processing device, for executing either of division and remainder instructions with efficiency, each of the division and remainder instructions having a code in which information on the size of dividend data is placed.

2. Description of the Prior Art

An instruction set for 32-bit microprocessors can have division and remainder instructions. In either of division and remainder instructions, an operand that can be either one of the divisor and the dividend is handled as a 32-bit binary value.

Referring now to FIG. 10, there is illustrated a diagram showing the code of each of division and remainder instructions included in an instruction set provided by a prior art data processing device. In the figure, OP1 denotes a first operand code, OP2 denotes a second operand code, R1 denotes a destination register identifier, R2 denotes a source register identifier, and C denotes a constant number portion.

In general, each of division and remainder instructions provided by a data processing device can identify both a destination register and a source register using the destination and source register identifiers thereof. For example, division instructions can identify a register storing the dividend with the destination register identifier R1 thereof, identify another register storing the divisor with the source register identifier R2 thereof, and store the division result into the register identified by the destination register identifier R1. Each of division and remainder instructions does not use information placed in the constant number portion C.

Most prior art data processing devices adopt nonrestoring division as a division algorithm. Although the nonrestoring division is a typical division algorithm, one iteration of division processing computes only one-bit output and therefore much time is spent in computing all one-bit outputs in order to completely perform the division processing, thus reducing the division processing speed.

Referring next to FIG. 11, there is illustrated a flow diagram showing a division algorithm adopted by prior art data processing devices. FIG. 12 shows a block diagram showing hardware required for performing the division algorithm as shown in FIG. 11. In FIG. 12, reference numeral 121 denotes a 32-bit ALU for performing arithmetic operations, numeral 122 denotes a remainder register for storing a remainder, the right-hand 32 bits of the remainder register constituting an extended register, numeral 123 denotes a register, which will be referred to as divisor register, for storing a divisor, and numeral 124 denotes a control circuit for controlling the ALU 121 and the remainder register 122.

Next, a description will be made as to a flow of division processing based on the nonrestoring division in prior art data processing devices, assuming that both the dividend and the divisor are positive numbers.

First, the control circuit 124, in step ST111, stores the dividend data in the extended register, i.e., the right-hand half of the remainder register 122, and then sets all of the left-hand 32 bits of the remainder register 122 to zero. Furthermore, the control circuit 124 causes the remainder register 122 to shift the data loaded thereinto left one bit position.

The ALU 121 then, in step ST112, subtracts the contents of the divisor register 123 from the contents of the left-hand half of the remainder register 122, and then loads the subtraction result into the left-hand half of the remainder register 122.

The control circuit 124 then, in step ST113, determines whether or not the remainder stored in the left-hand half of the remainder register 122 is equal to or greater than zero. If the remainder is equal to or greater than zero, the control circuit advances step ST115 in which it causes the remainder register 122 to shift the contents thereof left one bit position and sets a new bit at the far-right position of the remainder register 122 to one. After that, the control circuit 124 advances to step ST116.

In performing step ST113, if the remainder is less than zero, the control circuit advances step ST114 in which the ALU 121 adds the contents of the divisor register 123 to the data stored in the left-hand half of the remainder register 122 so as to return the data stored in the left-hand half of the remainder register 122 to its previous value stored before step ST112, and then stores the addition result in the left-hand half of the remainder register 122. After that, the control circuit 124 causes the remainder register 122 to shift the contents thereof left one bit position and sets a new bit at the far-right position of the remainder register 122 to zero. The control circuit 124 then advances to step ST116.

The loop iteration comprised of the above-mentioned steps ST112 to ST116 is carried out thirty-two times. In step ST116, the control circuit 124 determines whether or not the number of times that the loop iteration comprised of the plurality of steps has been done is equal to or greater than 32. If the number of times that the loop iteration comprised of the plurality of steps has been carried out is less than 32, the control circuit 124 returns to step ST112, and then repeats the above-mentioned processes. After the loop iteration has been performed thirty-two times, the control circuit 124 advances to step ST117 in which it causes the remainder register 122 to shift the data stored in the left-hand half of the remainder register 122 right one bit position.

A problem with prior art data processing devices constructed as above is that since data on which an arithmetic operation is to be performed has a fixed length of 32 bits, the number of times that the loop iteration based on the nonrestoring division is done is fixed, that is, the loop iteration must be performed thirty-two times.

According to the nonrestoring division, when data that can be handled by prior art data processing devices has a significant bit width of N bits, the number of times that the loop iteration must be performed for each of division and remainder calculations can be N that is the same as the bit width of the data. In such a prior art data processing device, since operands have a fixed length of 32 bits, the loop iteration required for each of division and remainder calculations must be done a fixed number of times, i.e., thirty-two times, even if each operand has a significant data width less than 32 bits. Either of division and remainder calculations thus needs a fixed number of clock cycles at all times. Accordingly, when an operand in either of division and remainder instructions has a significant data width less than 32 bits, some loop iterations done upon the execution of the instruction are a time-wasting. In image processing that is a typical example in which division and remainder instructions are frequently issued, data to be processed is 8 or 16 bits in length in most cases. A 32-bit data area for the dividend data thus has a significant bit width of 8 or 16 bits. In this case, although eight or sixteen loop iterations are required for performing each of division and remainder calculations based on the nonrestoring division, thirty-two loop iterations are carried out actually. In this manner, the loop iteration required for executing each of division and remainder instructions must be done thirty-two times even though the bit length of data to be processed is less than 32 bits. Accordingly, some loop iterations carried out upon the execution of each of division and remainder instructions are a time-wasting in most cases, and hence much time is spent in executing each of division and remainder instructions.

SUMMARY OF THE INVENTION

The present invention is made to overcome the above problem. It is therefore an object of the present invention to provide a method of setting a number of times that an arithmetic loop iteration based on the nonrestoring division is done for executing either of division and remainder instructions, the number of times corresponding to a significant bit width of dividend data used for either of the division and remainder instructions, and a data processing device using the method, thus reducing the number of cycles required for the execution of either of the division and remainder instructions, improving the processing speed, making it possible to handle dividend data having an arbitrary bit length, and reducing the hardware cost required for executing either of the division and remainder instructions with dividend data having an arbitrary bit length.

In accordance with one aspect of the present invention, there is provided a data processing device comprising: an instruction decoding unit for decoding a code of either a division instruction or a remainder instruction applied thereto, the instruction code having a size field for storing data size information; a control unit for receiving a decoded result from the instruction decoding unit, the decoded result indicating the data size information stored in the size field of the instruction code, and for presetting a number of times that one loop iteration comprised of steps required for executing either the division instruction or the remainder instruction is to be carried out, based on the data size information; and an arithmetic unit for performing the loop iteration for either the division instruction or the remainder instruction only the number of times preset by the control unit.

When the instruction code is a code of a division instruction, the length of dividend data can be placed, as the data size information, in the size field of the instruction code. As an alternative, a value equal to (the length of data that can be handled by the data processing device−the length of dividend data) can be placed, as the data size information, in the size field of the instruction code. Then the control unit can preset the number of times that the loop iteration required for executing the division instruction is to be carried out by the arithmetic unit, based on the size field information of the dividend data placed in the size field of the instruction code.

When the instruction code is a code of a remainder instruction, the length of dividend data can be placed, as the data size information, in the size field of the instruction code. As an alternative, a value equal to (the length of data that can be handled by the data processing device−the length of dividend data) can be placed, as the data size information, in the size field of the instruction code. Then the control unit can preset the number of times that the loop iteration required for executing the remainder instruction is to be carried out by the arithmetic unit, based on the data size information on the dividend data placed in the size field of the instruction code.

In accordance with another aspect of the present invention, there is provided a data processing device comprising: an instruction decoding unit for decoding a code of either a division instruction or a remainder instruction applied thereto, the instruction code having a size field for storing data size information; a control unit for receiving a decoded result from the instruction decoding unit, indicating the data size information stored in the size field of the instruction code, and for presetting a number of times that one loop iteration comprised of steps required for executing either the division instruction or the remainder instruction is to be carried out based on nonrestoring division, based on the data size information; an arithmetic unit for performing the loop iteration for either the division instruction or the remainder instruction based on the nonrestoring division only the number of times preset by the control unit; the control unit setting a number of bits that dividend data associated with either the division instruction or the remainder instruction is to be shifted to a value equal to (the length of data that can be handled by the data processing device−the length of the dividend data); the arithmetic unit shifting the dividend data left the number of bits preset by the control unit; and the dividend data that has been shifted being applied to the arithmetic unit as input data required for performing the loop iteration for either the division instruction or the remainder instruction based on the nonrestoring division.

When the instruction code is a code of a division instruction, the length of the dividend data can be placed, as the data size information, in the size field of the instruction code. As an alternative, a value equal to (the length of data that can be handled by the data processing device−the length of the dividend data) can be placed, as the data size information, in the size field of the instruction code.

When the instruction code is a code of a remainder instruction, the length of the dividend data can be placed in, as the data size information, the size field of the instruction code. As an alternative, a value equal to (the length of data that can be handled by the data processing device−the length of the dividend data) can be placed, as the data size information, in the size field of the instruction code.

In accordance with a preferred embodiment of the present invention, when data that can be handled by the data processing device is $2^m$ (m is a positive integer) bits in length, the control unit includes an (m+1)-bit counter for counting the number of times that the loop iteration has been repeated by the arithmetic unit, presets an initial value of the (m+1)-bit counter to a value equal to (the length of data that can be handled by said data processing device−the data size information), and determines that the repetition of the loop is complete when the most significant bit of the (m+1)-bit counter becomes one from zero.

In accordance with a further aspect of the present invention, there is provided a method (or algorithm) for performing either of division and remainder calculations, for use with a data processing device, the method comprising the steps of: shifting dividend data, which is associated with either a division instruction or a remainder instruction, left a predetermined number of bits corresponding to a value equal to (the length of data that can be handled by the data processing device−the length of the dividend data); presetting a number of times that one loop iteration comprised of steps required for executing either the division instruction or the remainder instruction is to be carried out based on nonrestoring division to a value equal to the length of the dividend data; and applying the dividend data that has been shifted left the predetermined number of bits, as input data, to the loop being repeated based on the nonrestoring division, for executing either the division instruction or the remainder instruction.

Further objects and advantages of the present invention will be apparent from the following description of the preferred embodiments of the invention as illustrated in the accompanying drawings.

BRIEF DESCRIPTION OF THE DRAWINGS

FIG. 4 is a flow diagram showing the execution of a division by the data processing device, as shown in FIG. 1, according to the first embodiment of the present invention;

FIG. 6 is a diagram showing various control signals for use with the hardware components, as shown in FIG. 2, provided for executing either of division and remainder instructions;

FIG. 8 is a block diagram showing the structure of a loop iteration completion detecting unit of a data processing device according to a second embodiment of the present invention;

FIG. 9 is a view showing a relationship among the bit lengths of dividend and divisor data, the number of bits that the dividend data is to be shifted left, and the initial value set to a counter;

FIG. 10 is a diagram showing the code of each of division and remainder instructions included in an instruction set provided by a prior art data processing device;

DETAILED DESCRIPTION OF THE PREFERRED EMBODIMENTS

First Embodiment

Figure 1:
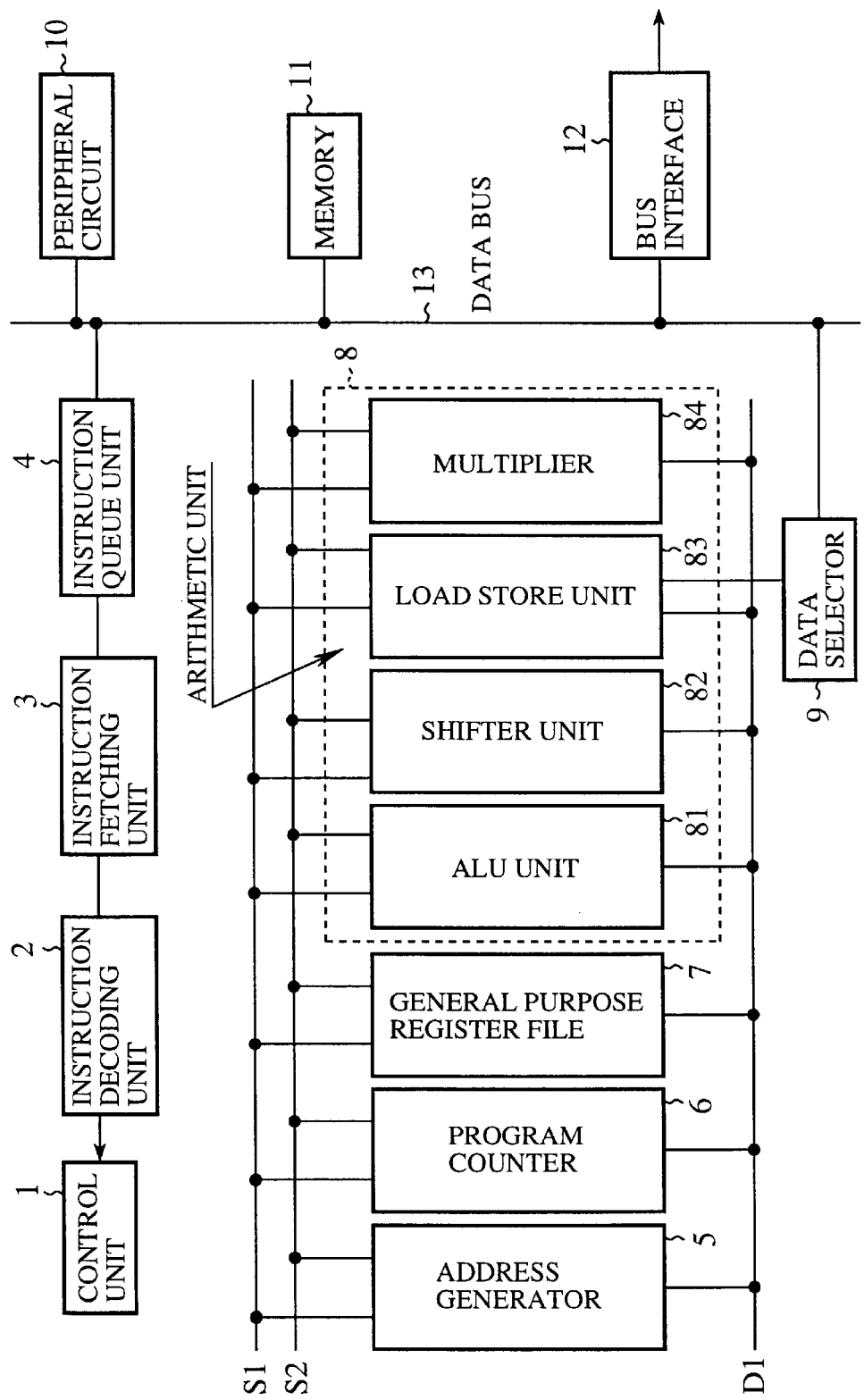
FIG. 1 is a block diagram showing the structure of a data processing device according to a first embodiment of the present invention.

Referring next to FIG. 1, there is illustrated a block diagram showing the structure of a data processing device, such as a microprocessor, according to a first embodiment of the present invention. In the figure, reference numeral 1 denotes a control unit for controlling the data processing device, numeral 2 denotes an instruction decoding unit, numeral 3 denotes an instruction fetching unit, numeral 4 denotes an instruction queue unit, numeral 5 denotes an address generating unit, numeral 6 denotes a program counter or PC, numeral 7 denotes a general purpose register file, numeral 8 denotes an arithmetic unit, numeral 9 denotes a data selector, numeral 10 denotes a peripheral circuit, numeral 11 denotes a memory, and numeral 12 denotes a bus interface. The above-mentioned components of the data processing device are connected to one another by way of internal buses S1, S2, and D1, and a data bus 13. The arithmetic unit 8 includes an ALU unit 81, a shifter unit 82, a load store unit 83, and a multiplier 84.

The bus interface 12 can connect the data processing device with either an external memory (not shown) or a peripheral device (not shown) by way of the data bus, according to a control signal applied thereto.

The general purpose file 7 is 32 bits in width and is comprised of a group of 16 registers. The general purpose file 7 can store divisor and dividend data, which can be handled by the data processing device according to the present invention.

The instruction decoding unit 2 is comprised of an instruction decode input latch (not shown) and an instruction decoder (not shown). The instruction decode input latch receives an instruction code from the instruction fetching unit 3, and stores the instruction code therein. The instruction decode input latch also furnishes a significant part of the 32-bit bit pattern of the instruction code stored in the instruction decode input latch. The instruction decoder then decodes the instruction code and furnishes the decoded result to the control unit 1.

The control unit 1 controls all the components of the data processing device according to the decoded result of the instruction code furnished by the instruction decoding unit 2. The address generating unit 5 is comprised of a shifter (not shown) and an adder (not shown) and computes an address for a branch instruction according to an addressing mode.

Figure 2:
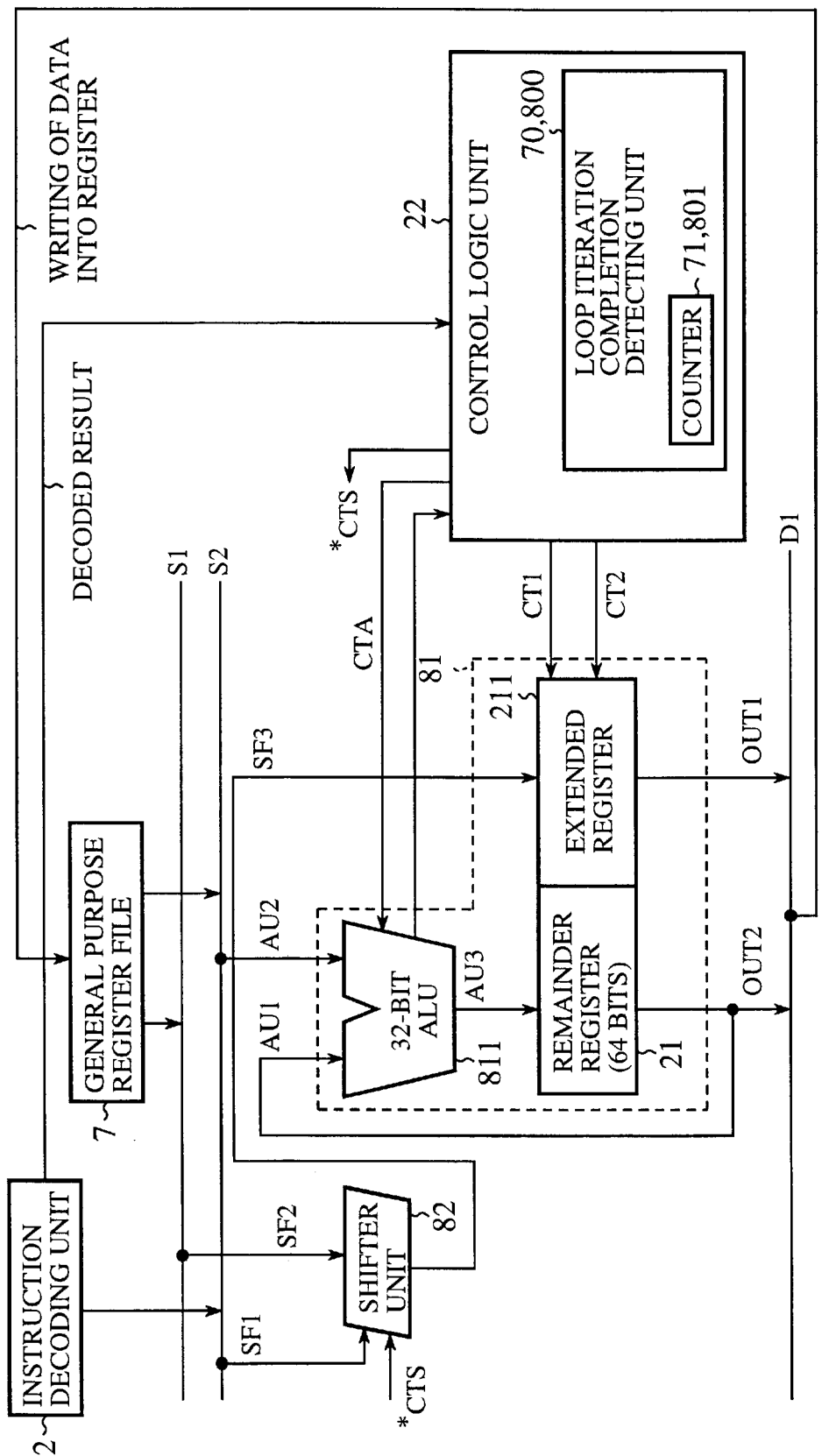
FIG. 2 is a block diagram showing hardware disposed for the data processing device of the first embodiment as shown in FIG. 1, for executing each of division and remainder instructions.

Referring next to FIG. 2, there is illustrated a block diagram showing hardware disposed for the data processing device of the first embodiment as shown in FIG. 1, for executing each of a division instruction and a remainder instruction. In FIG. 2, reference numeral 21 denotes a remainder register, numeral 211 denotes an extended register disposed within the remainder register 21, numeral 22 denotes a control logic unit for controlling the execution of either a division instruction or a remainder instruction, and numeral 811 denotes an arithmetic unit or ALU that constitutes the ALU unit 81. The control logic unit 22 can be incorporated into the control unit 1 as shown in FIG. 1.

Next, a description will be made as to the operation of the data processing device according to the first embodiment of the present invention, assuming that both the dividend and division are positive numbers. The data processing device, as shown in FIG. 1, according to the first embodiment of the present invention can process data, such as the dividend data, having an arbitrary bit length, i.e., n-bit data. However, since data that can be handled by the data processing device according to the first embodiment are 32 bits in length, for example, the bit length n of the dividend data has to be an integer that satisfies the following inequality: $0<n\leq32$.

Figure 3:
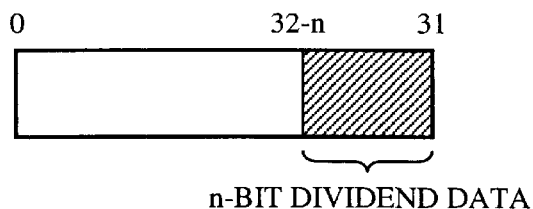
FIG. 3 is a diagram showing a location where dividend data is loaded in a 32-bit register of the data processing device, as shown in FIG. 1, of the first embodiment of the present invention.

Referring next to FIG. 3, there is illustrated a diagram showing a location where the dividend data is loaded in a 32-bit register of the data processing device, as shown in FIG. 1, of the first embodiment of the present invention. When executing either a division instruction or a remainder instruction in the data processing device of the first embodiment, n-bit dividend data is loaded and placed in an n-bit area from bit (32−n) to bit 31 of the 32-bit register, as shown in FIG. 3.

Figure 5:
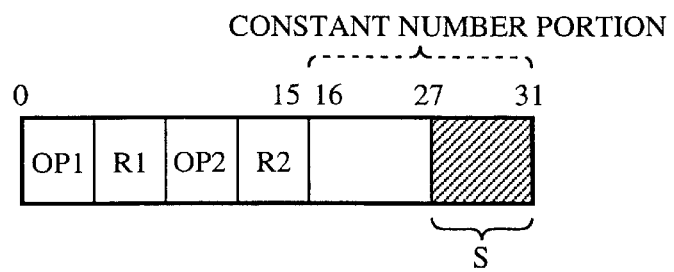
FIG. 5 is a diagram showing the instruction code of either of division and remainder instructions included in the instruction set of the data processing device, as shown in FIG. 1, according to the first embodiment of the present invention.

Referring next to FIG. 4, there is illustrated a flow diagram showing the execution of a division by the data processing device, as shown in FIG. 1, according to the first embodiment. FIG. 5 shows a diagram showing the instruction code of either of division and remainder instructions included in the instruction set of the data processing device as shown in FIG. 1. In the figure, OP1 denotes a first operand code, OP2 denotes a second operand code, R1 denotes a destination register identifier, R2 denotes a source register identifier, and S denotes a size field.

Either of division and remainder instructions, which can be executed by the data processing device as shown in FIG. 1, can identify destination and source registers using its destination register and source register identifiers. For example, when executing a division instruction, the data processing device can identify a first register storing the dividend based on the destination register identifier R1 of the division instruction, identify a second register storing the divisor based on the source register identifier R2 of the division instruction, and store the division result in the first register identified by the destination register identifier Ri. In addition, the data processing device can store information on the size of the dividend data in the size field of the division instruction. In this manner, the data processing device according to the first embodiment of the present invention uses part of the constant number portion C of the instruction code of either of division and remainder instructions as the size field S, whereas, in prior art, each of division and remainder instructions does not use information placed in the constant number portion C. The data processing device then stores the information on the size of the dividend in the size field S.

Referring next to FIG. 6, there is illustrated a diagram showing various control signals for use with the hardware components, as shown in FIG. 2, provided for executing either of division and remainder instructions.

The instruction decoding unit 2 decodes the instruction code and then furnishes the decoded result to the control logic section 22 of the control unit. When the decoded result indicates that the instruction code is either a division instruction code or a remainder instruction code, the control logic section 22 starts executing either the division instruction or the remainder instruction. In this case, the general purpose file 7 stores dividend and divisor data associated with either the division instruction code or the remainder instruction code. The general purpose file 7 includes a register that stores the divisor data, which will be hereinafter referred to as divisor register.

The dividend and divisor data can be send out on the internal buses S1 and S2 from the general purpose file 7. The control logic section 22 of the control unit 1 can control the operation of the arithmetic unit 8 and start a loop iteration completion detecting unit 70 disposed within the control logic section 22.

Figure 7:
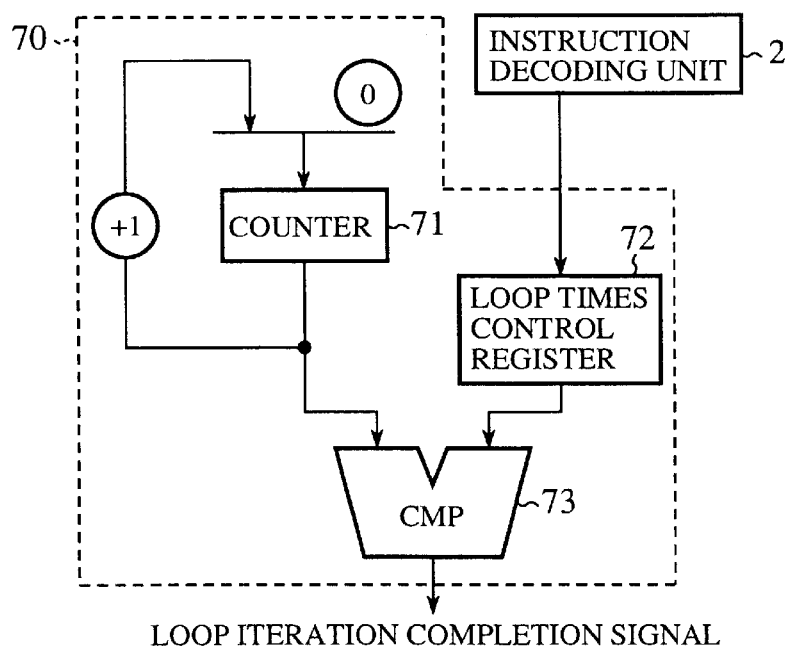
FIG. 7 is a block diagram showing the structure of a loop iteration completion detecting unit the data processing device according to the first embodiment of the present invention.
Figure 11:
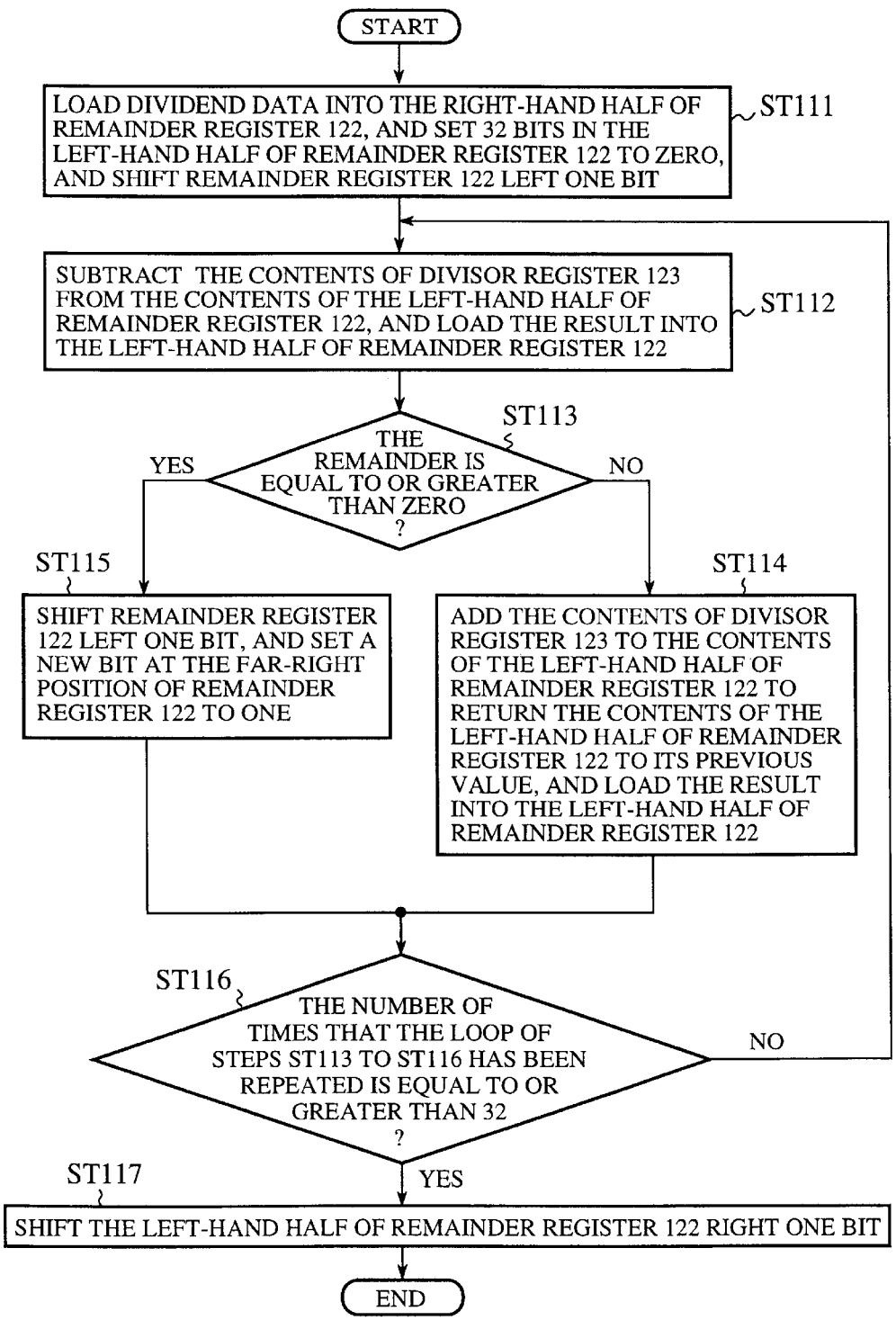
FIG. 11 is a flow diagram showing a division algorithm adopted by prior art data processing devices.
Figure 12:
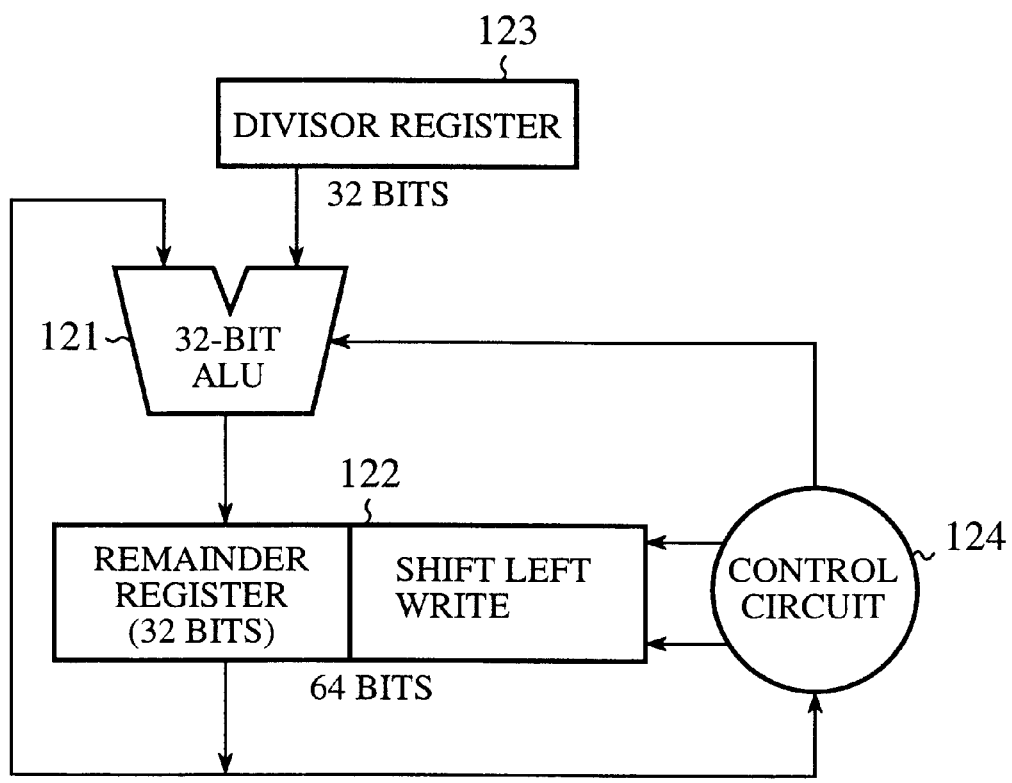
FIG. 12 is a block diagram showing hardware required for performing the division algorithm as shown in FIG. 11.

Referring next to FIG. 7, there is illustrated a block diagram showing the structure of the loop iteration completion detecting unit 70. In the figure, reference numeral 71 denotes a counter for counting the number of times that one loop iteration, which will be described below, is carried out, numeral 72 denotes a loop times control register, and numeral 73 denotes a comparator.

The execution of either of division and remainder instructions by the ALU unit 81 generates an arithmetic result that is stored in the 64-bit remainder register 21. The remainder register 21 is comprised of a 32-bit register for storing the quotient that will result from the execution of either of division and remainder instructions, the 32-bit register being located in the left-hand half of the remainder register 21, and the extended register 211 for storing the remainder that will result from the execution of either of division and remainder instructions. The arithmetic result stored in the remainder register 21 is further loaded into the general purpose register file 7 by way of the internal bus D1.

Next, a description will be made as to a method (or algorithm) for executing either of division and remainder instructions, for use with the data processing device having the features as mentioned above, with reference to the flow diagram as shown in FIG. 4.

The instruction decoding unit 2 decodes the instruction code of either of division and remainder instructions first. The instruction decoding unit 2 then furnishes the decoded result to the control logic section 22. When the decoded result indicates that the decoded instruction is a division instruction or remainder instruction, the control logic section 22 starts execution of a division. The control logic section 22 then retrieves information on the size of the dividend data from the size field S of the instruction code. The control logic section 22 subtracts the length of the dividend data from the length (e.g., 32 bits) of data that can be handled by the data processing device, such as a microprocessor, and then sets the number of bits that the dividend data is to be shifted to the subtraction result, e.g., (32−n), where n is the length of the dividend data. The control logic section sends out shift width data indicating the number of bits, e.g., (32−n), that the dividend data is to be shifted on the internal bus S2, and then reads the dividend data from the general purpose register file 7 and sends out the dividend data on the internal bus S1.

The shift width and dividend data are then furnished, by way of paths SF1 and SF2, to the shifter unit 82. A control signal CTS furnished by the control logic section 22 makes the shifter unit 82 shift the dividend data applied thereto left according to the shift width data. The dividend data shifted by the shifter unit 82 is loaded, by way of a path SF3, into the extended register 211 within the remainder register 21. All bits (e.g., 32 bits) in the left-hand half of the remainder register 21 are set to zero.

In this manner, the shifter unit 82, in step ST41, shifts the dividend data left (32−n) bits under control of the control logic section 22 so as to skip unnecessary data, and then loads the shifted dividend data into the extended register 211. The shifter unit 82 further sets all 32 bits in the left-hand half of the remainder register 21 to zero.

The control logic unit 22 then, in step ST42, furnishes control signals CT1 and CT2 to the remainder register 21 so as to cause the remainder register 21 to shift the data stored therein left one bit position. The control signal CT1 indicates the direction in which the data stored in the remainder register is to be shifted. The other control signal CT2 indicates data to be stored in the LSB of the remainder register.

Next, an iterative process comprised of a plurality of steps is started. First, an initial value of zero is set to a counter 71 disposed within the loop iteration completion detecting unit 70 as shown in FIG. 7. The control logic unit 22 then reads the divisor data from a divisor register (not shown) of the general purpose register file 7 and sends out the divisor data on the internal bus S2. The divisor data is transferred, by way of a path AU2, to the ALU 811 of the ALU unit 81. On the other hand, the data stored in the 32-bit left-hand half of the remainder register 21 is transferred to the ALU 811 by way of a path AU1. The ALU 811 then executes a subtraction process in response to a control signal CTA generated by the control logic unit 22. In this case, the ALU 811 subtracts the data applied thereto via the path AU2 from the other data applied thereto via the path AU1. The arithmetic result is then stored in the 32-bit left-hand half of the remainder register 21.

In this manner, the ALU 811, in step ST43, subtracts the divisor stored in the divisor register (not shown) within the general purpose register file 7 from the contents of the 32-bit left-hand half of the remainder register 21, and then loads the subtraction result into the 32-bit left-hand half of the remainder register 21.

The control logic unit 22 then, in step ST44, determines whether or not the remainder is equal to or greater than zero. The control logic unit retrieves the most significant bit or MSB of the subtraction result as a control signal DVSGN. When the control signal DVSGN is at state 0 indicating that the remainder is equal to or greater than zero, the flow of the operation of the data processing device advances to step ST45. In contrast, when the control signal DVSGN is at state 1 indicating that the remainder is less than zero, the flow of the operation of the data processing device advances to step ST46.

The control logic unit 22, in step ST45, generates a control signal CT1 indicating that the data stored in the remainder register 21 is to be shifted left one bit position, and a control signal CT2 at state 1 indicating that the least significant bit or LSB of the remainder register 21 is to be set to one. As a result, the data stored in the remainder register 21 is shifted left one bit position and a new bit at the far-right position of the remainder register 21 is set to one. After that, the control logic unit 22 advances to step ST47.

On the other hand, the control logic unit 22, instep ST46, transfers the divisor data from the internal bus S2 to the ALU 811, by way of the path AU2. The data stored in the left-hand half of the remainder register 21 is also transferred to the ALU 811 by way of the path AU1. The ALU 811 then sums the data applied thereto by way of the path AU1 and the other data applied thereto by way of the path AU2. In other words, the ALU 811 adds the value of the divisor register (not shown) to the data loaded into the left-hand half of the remainder register 21 under control of the control logic section 22 so as-to return the contents of the remainder register 21 to the previous value that the remainder register 21 had immediately before performing the subtraction in step ST43, and then store the addition result in the 32-bit left-hand half of the remainder register 21. The control logic unit 22 then generates a control signal CT1 indicating that the data stored in the remainder register 21 is to be shifted left one bit position, and another control signal CT2 at state 0 indicating that the LSB of the remainder register 21 is to be set to zero. In other words, the data stored in the remainder register 21 is shifted left one bit position and a new bit at the far-right position of the remainder register 21 is set to zero. After that, the control logic unit 22 advances to step ST47.

In performing step ST47, the control logic section 22 determines whether the number of times that the loop iteration of plural steps ST43 to ST47 has been done is equal to or greater than n. If the number of times that the iterative process has been repeated is less than n, the control logic unit returns to step ST43 in which it will carry out the next iterative process as mentioned above. In other words, the control logic unit carries out the loop iteration comprised of steps ST43 to ST47 n times. In contrast, if the loop iteration has been performed n times, the control logic unit advances to step ST48.

The control logic unit 22 then, in step ST48, generates a control signal CT1 indicating that the data stored in the remainder register 21 is to be shifted right one bit position. As a result, the data stored in the remainder register 21 is shifted right one bit position. When executing a division instruction, the data (i.e., quotient) stored in the extended register 211 is sent out, by way of a path OUT1, on the internal bus D1. When executing a remainder instruction, the data (i.e., remainder) stored in the remainder register 21 is sent out, by way of a path OUT2, on the internal bus D1. The arithmetic result is then transferred to and stored in a register, which is identified by the destination register identifier of the instruction code, by way of the internal bus D1.

The loop iteration completion detecting unit 70 that can detect the completion of all needed loop iterations performed by the ALU 811, as mentioned above, manages the number of times that the iterative process has been repeated in the following manner. The loop times control register 72 is a register for storing the number of times that the loop iteration based on the nonrestoring division can be done. The counter 71 increments itself by one every time the loop iteration comprised of steps ST43 to ST47 is carried out once. When data that can be handled by the data processing device, as shown in FIG. 1, according to the first embodiment of the present invention is 32 bits in length, the size n of the dividend data must be greater than 0 and equal to or less than 32 and hence the maximum number of times that the loop iteration comprised of steps ST43 to ST47 can be performed is 32. The counter 71 thus needs to count up to 32, and therefore it can be a 6-bit counter enough for counting up to $32=2^5$. The comparator 73 compares the contents of the loop times control register 72 with the count value of the counter 71, and furnishes a loop iteration completion signal that is a control signal to instruct the control logic unit to stop performing the iteration process when the contents of the loop times control register 72 matches the count value of the counter 71.

The loop iteration completion detecting unit 70 detects the completion of the iteration process in the following manner. First, the instruction decoding unit 2 retrieves the information on the size of the dividend data from the size field S of the instruction code of either of division or remainder instructions, and then generates a signal indicating the information on the size of the dividend data. The initial value of the counter 71 is then set to zero. The instruction decoding unit 2 furnishes the signal indicating the information on the size of the dividend data to the loop times control register 72. Every time the loop iteration comprised of the plurality of steps is done once, the counter 71 increments itself by one. The comparator 73 generates the loop iteration completion signal when the value of the counter 71 matches the contents of the loop times control register 72. The control logic unit thus completes the iterative process.

As previously mentioned, in accordance with the first embodiment of the present invention, information on the size of a dividend can be stored in the size field S provided in a constant number portion of the instruction code of either of division and remainder instructions. Accordingly, unlike prior art data processing devices, the data processing device of the first embodiment can set the number of times that the loop iteration based on the nonrestoring division is carried out for performing a division or remainder calculation to an optimum value corresponding to the significant bit width of the dividend data without having to set the number of times to a fixed value, thus reducing the number of cycles required for the execution of either of division and remainder instructions. The data processing device of the first embodiment thus can handle arbitrary-sized dividend data, while prior art data processing devices handle fixed length data only. In addition, the cost of hardware required for processing arbitrary-sized dividend data can be reduced.

Second Embodiment

Referring next to FIG. 8, there is illustrated a block diagram showing the structure of a loop iteration completion detecting unit 800 of a data processing device according to a second embodiment of the present invention. In the figure, reference numeral 801 denotes a counter disposed within the loop iteration completion detecting unit 800. The other components of the data processing device according to the second embodiment, which are designated by the same reference numerals as shown in FIGS. 1 and 2, are the same as those of the data processing device according to the above-mentioned first embodiment, and therefore the description of the other components will be omitted hereinafter.

In the data processing device according to the second embodiment, a value equal to (the size of data that can be handled by the data processing device–the size of dividend data) can be prestored in the size field S of the instruction code of either of division and remainder instructions as shown in FIG. 5. When data that can be handled by the data processing device is 32 bits in length, the value stored in the size field of the instruction code is (32−n), where n is the size of dividend data.

A shifter unit 82 shifts the dividend data applied thereto by way of a path SF2 in the direction (i.e., left) specified by a control signal CTS and for the number of bit positions specified by the information stored in the size field S, which is applied thereto by way of a path SF1, and then loads the shifted dividend data into a remainder register 21. The data processing device of the second embodiment thus does not need to retrieve information on the size of the dividend data from the size field S of the instruction code, and subtract the length of the dividend data from the length (e.g., 32 bits) of data that can be handled by the data processing device, such as a microprocessor, so as to compute the number of bits that the dividend data is to be shifted, e.g., (32−n), where n is the length of the dividend data, unlike the data processing device of the aforementioned first embodiment. Accordingly, the second embodiment can reduce the amount of hardware and the time required for the execution of either of division and remainder instructions.

The counter 801 has the same size as the counter 71 of the data processing device according to the first embodiment. In other words, when data that can be handled by the data processing device according to the second embodiment of the present invention is 32 bits in length, the size n of the dividend data must be greater than 0 and equal to or less than 32 and hence the maximum number of times that one loop iteration based on the nonrestoring division can be carried out is 32. The counter 801 thus needs to count up to 32, and therefore it can be a 6-bit counter enough for counting up to $32=2^5$. An initial value of the counter 801 is set to (32−n). The MSB of the counter 801 has an initial value of zero. When the MSB of the counter 801 becomes 1 from zero, the counter 801 asserts a loop iteration completion signal indicating that the iterative process is complete.

Referring next to FIG. 9, there is illustrated a view showing a relationship among the bit lengths of the dividend and divisor data, the number of bits that the dividend data is to be shifted left, and the initial value set to the counter 801. An instruction decoding unit 2 decodes the instruction code first. The decoded result is transferred to a control logic section 22. The control logic section 22 then retrieves information indicating the number of bits that the dividend data is to be shifted from the size field S of the instruction code as shown in FIG. 5, and generates a signal indicating the amount of shift. The control logic section 22 furnishes the signal to the counter 801 to set an initial value corresponding to the value of the signal to the counter 801.

Every time the loop iteration from step ST43 to step ST47 of FIG. 4 is performed once, the counter 801 increments itself by one. After the loop iteration has been carried out n times, the counter 801 reaches 32 and the MSB of the counter 801 becomes one from zero. As a result, the counter 801 asserts the loop iteration completion signal.

As previously mentioned, in accordance with the second embodiment, the data processing device can store a value equal to (the size of data that can be handled by the data processing device–the size of dividend data) in the size field S of the instruction code of either of division and remainder instructions. The data processing device of the second embodiment does not need to retrieve information on the size of the dividend data from the size field S of the instruction code, and subtract the length of the dividend data from the length (e.g., 32 bits) of data that can be handled by the data processing device, so as to compute the number of bits that the dividend data is to be shifted, e.g., (32−n), where n is the length of the dividend data, unlike the data processing device of the aforementioned first embodiment. The data processing device can thus make the counter 801 produce the loop iteration completion signal asserted when the MSB of the counter 801 becomes one from zero, by setting the initial value of the counter 801 to (the size of data that can be handled by the data processing device–the size of dividend data), which is stored in the size field S of the instruction code.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data processing device comprising:

instruction decoding means for decoding a code of either a division instruction or a remainder instruction applied thereto, the instruction code having a size field for storing data size information having an arbitrary bit length;

control means for receiving a decoded result from said instruction decoding means, the decoded result indicating the data size information stored in the size field of the instruction code, and for presetting a number of times that one loop iteration comprised of steps required for executing either the division instruction or the remainder instruction is to be carried out, based on the data size information; and arithmetic means for performing the loop iteration for either the division instruction or the remainder instruction only the number of times preset by said control means.

2. The data processing device according to claim 1, wherein when the instruction code is a code of a division instruction, the length of dividend data is placed, as the data size information, in the size field of the instruction code, and wherein said control means presets the number of times that the loop iteration required for executing the division instruction is to be carried out by said arithmetic means, based on the data size information on the dividend data placed in the size field of the instruction code.

3. The data processing device according to claim 1, wherein when the instruction code is a code of a remainder instruction, the length of dividend data is placed, as the data size information, in the size field of the instruction code, and wherein said control means presets the number of times that the loop iteration required for executing the remainder instruction is to be carried out by said arithmetic means, based on the data size information on the dividend data placed in the size field of the instruction code.

4. The data processing device according to claim 1, wherein when the instruction code is a code of a division instruction, a value equal to (the length of data that can be handled by said data processing device−the length of dividend data) is placed, as the data size information, in the size field of the instruction code, and wherein said control means presets the number of times that the loop iteration required for executing the division instruction is to be carried out by said arithmetic means, based on the data size information on the dividend data placed in the size field of the instruction code.

5. The data processing device according to claim 1, wherein when the instruction code is a code of a remainder instruction, a value equal to (the length of data that can be handled by said data processing device−the length of dividend data) is placed, as the data size information, in the size field of the instruction code, and wherein said control means presets the number of times that the loop iteration required for executing the remainder instruction is to be carried out by said arithmetic means, based on the data size information on the dividend data placed in the size field of the instruction code.

6. A data processing device comprising:
instruction decoding means for decoding a code of either a division instruction or a remainder instruction applied thereto, the instruction code having a size field for storing data size information;
control means for receiving a decoded result from said instruction decoding means, indicating the data size information stored in the size field of the instruction code, and for presetting a number of times that one loop iteration comprised of steps required for executing either the division instruction or the remainder instruction is to be carried out based on nonrestoring division, based on the data size information;
arithmetic means for performing the loop iteration for either the division instruction or the remainder instruction based on the nonrestoring division only the number of times preset by said control means;
said control means setting a number of bits that dividend data associated with either the division instruction or the remainder instruction is to be shifted to a value equal to (the length of data that can be handled by said data processing device−the length of the dividend data);
said arithmetic means shifting the dividend data left the number of bits preset by said control means; and
the dividend data that has been shifted being applied to said arithmetic means as input data required for performing the loop iteration for either the division instruction or the remainder instruction based on the nonrestoring division.

7. The data processing device according to claim 6, wherein when the instruction code is a code of a division instruction, the length of the dividend data is placed, as the data size information, in the size field of the instruction code.

8. The data processing device according to claim 7, wherein when data that can be handled by said data processing device is $2^m$ (m is a positive integer) bits in length, said control means includes an (m+1)-bit counter for counting the number of times that the loop iteration has been repeated by said arithmetic means, presets an initial value of said (m+1)-bit counter to a value equal to (the length of data that can be handled by said data processing device−the data size information), and determines that the repetition of the loop is complete when the most significant bit of said (m+1)-bit counter becomes one from zero.

9. The data processing device according to claim 6, wherein when the instruction code is a code of a remainder instruction, the length of the dividend data is placed, as the data size information, in the size field of the instruction code.

10. The data processing device according to claim 9, wherein when data that can be handled by said data processing device is $2^m$ (m is a positive integer) bits in length, said control means includes an (m+1)-bit counter for counting the number of times that the loop iteration has been repeated by said arithmetic means, presets an initial value of said (m+1)-bit counter to a value equal to (the length of data that can be handled by said data processing device−the data size information), and determines that the repetition of the loop is complete when the most significant bit of said (m+1)-bit counter becomes one from zero.

11. The data processing device according to claim 6, wherein when the instruction code is a code of a division instruction, a value equal to (the length of data that can be handled by said data processing device−the length of the dividend data) is placed, as the data size information, in the size field of the instruction code.

12. The data processing device according to claim 1, wherein when data that can be handled by said data processing device is $2^m$ (m is a positive integer) bits in length, said control means includes an (m+1)-bit counter for counting the number of times that the loop iteration has been repeated by said arithmetic means, presets an initial value of said (m+1)-bit counter to a value equal to the data size information, and determines that the repetition of the loop is complete when the most significant bit of said (m+1)-bit counter becomes one from zero.

13. The data processing device according to claim 6, wherein when the instruction code is a code of a remainder instruction, a value equal to (the length of data that can be handled by said data processing device−the length of the dividend data) is placed, as the data size information, in the size field of the instruction code.

14. The data processing device according to claim 13, wherein when data that can be handled by said data processing device is $2^m$ (m is a positive integer) bits in length, said control means includes an (m+1)-bit counter for counting the number of times that the loop iteration has been repeated by said arithmetic means, presets an initial value of said (m+1)-bit counter to a value equal to the data size information, and determines that the repetition of the loop is complete when the most significant bit of said (m+1)-bit counter becomes one from zero.

15. A method of performing either of division and remainder calculations, for use with a data processing device, said method comprising the steps of:
shifting dividend data, which is associated with either a division instruction or a remainder instruction, left a predetermined number of bits corresponding to a value equal to (the length of data that can be handled by said data processing device−the length of the dividend data);
presetting a number of times that one loop iteration comprised of steps required for executing either the division instruction or the remainder instruction is to be carried out based on nonrestoring division to a value equal to the length of the dividend data; and applying the dividend data that has been shifted left the predetermined number of bits, as input data, to the loop being repeated based on the nonrestoring division, for executing either the division instruction or the remainder instruction.

* * * * *

UNITED STATES PATENT AND TRADEMARK OFFICE
CERTIFICATE OF CORRECTION

PATENT NO. : 6,560,624 B1
DATED : May 6, 2003
INVENTOR(S) : Sugako Otani et al.

It is certified that error appears in the above-identified patent and that said Letters Patent is hereby corrected as shown below:

<u>Column 14,</u>
Line 31, "claim 1" is changed to -- claim 11 --.

Signed and Sealed this

Twenty-seventh Day of April, 2004

JON W. DUDAS
*Acting Director of the United States Patent and Trademark Office*